United States Patent [19]

Hatsutta et al.

[11] Patent Number: 4,626,028
[45] Date of Patent: Dec. 2, 1986

[54] SEAT FOR VEHICLES

[75] Inventors: Susumu Hatsutta; Yasuji Ikisu, both of Tokyo, Japan

[73] Assignees: Mitsubishi Motors Corp.; Tachikawa Spring Co., Ltd., both of Japan

[21] Appl. No.: 659,626

[22] Filed: Oct. 11, 1984

[51] Int. Cl.$^4$ ............................................. A47C 31/00
[52] U.S. Cl. ................................. 297/289; 297/366; 297/408
[58] Field of Search ............. 297/353, 366, 379, 408, 297/300, 284, 460, 452, 367, 372

[56] References Cited

U.S. PATENT DOCUMENTS

| | | | |
|---|---|---|---|
| 2,760,559 | 8/1956 | Austin | 297/408 X |
| 2,784,771 | 3/1957 | Hendrickson | 297/408 X |
| 3,588,172 | 6/1971 | McGregor | 297/284 X |
| 3,931,996 | 1/1976 | Yoshimura | 297/366 |
| 4,234,228 | 11/1980 | Flamm | 297/284 X |

FOREIGN PATENT DOCUMENTS

| | | | |
|---|---|---|---|
| 140021 | 2/1980 | Fed. Rep. of Germany | 297/284 |
| 163606 | 12/1981 | Japan | 297/284 |
| 89436 | 6/1983 | Japan | 297/284 |

Primary Examiner—Peter A. Aschenbrenner
Attorney, Agent, or Firm—Hoffmann, Dilworth Barrese & Baron

[57] ABSTRACT

A seat for vehicles such as automobiles etc., wherein a seatback is splitted into an upper part and a lower part and each of these splitted upper and lower parts is equipped with a respective reclining device. An intermediate releasing device which reclines the upper part is mounted on the opposite side in relation to the reclining device of the lower part and a lock release lever of the intermediate reclining device is also mounted on the opposite side in relation to the reclining device of the lower part.

6 Claims, 3 Drawing Figures

SEAT FOR VEHICLES

BACKGROUND OF THE INVENTION

The present invention relates to a seat for vehicles such as automobiles, and more particularly relates to an improvement of a seat for vehicles in which a seatback frame is split into two parts, an upper part and a lower part, the upper part being connected to the lower part freely for adjustment at an incline. The lower part is provided with a reclining device at one side of the bottom of the lower seat.

Hitherto intermediate reclining devices for automobile seats as described above have been installed between upper and lower frames so that the upper frame can be inclined in the forward and backward direction in relation to the lower frame. These devices were either provided on the reclining device side of the lower frame or provided between the left and right directions as disclosed in Japanese Utility Model Laid-Open Publication No. 140353/1981.

According to the former case as set forth above, the lock release lever of the intermediate reclining device was mounted on the same side as the reclining device side of a lower frame directly through a rod. This construction has merit, as compared with the latter case set forth above, in which the connection to the lock release lever was made through a cable, since the cable-adjusting procedure associated with the latter case was eliminated. But, since both reclining devices are mounted on one side of a seatback frame, the balance and strength of the seatback frame has been found to be insufficient. Furthermore, the lock release levers of both reclining devices were close to each other resulting in the possibility of erroneous operation.

In the latter case as set forth above, the lock release lever and lock mechanism of the reclining device are connected by means of a cable, thus requiring adjustment of a connecting cable.

SUMMARY OF THE INVENTION

The present invention eliminates the drawbacks of the above-mentioned conventional products. That is, an object of the present invention is to increase the strength of the setback frame which is split into two parts—an upper part and a lower part.

In order to achieve the above object according to the present invention, an intermediate reclining device is located at the opposite side of the reclining device of the lower frame. Because of this construction, both reclining devices are well balanced in relation to the seatback frame, and the strength of the seat frame is not decreased as in the known conventional products.

Another object of the invention is to simplify the construction and operation of the lock mechanism by operating the lock release lever without a cable-adjusting procedure as required in the above-mentioned conventional products employing a cable.

Accordingly, the present invention includes a lock mechanism directly connected to the lock release lever of the intermediate reclining device by a rod.

Still another object of the present invention is to provide an arrangement wherein a passenger will not erroneously operate the reclining device of the lower frame in place of the intermediate reclining device.

For this purpose, according to the present invention, the lock release levers of the two reclining devices are located on the left and right sides of the seatback frame as described above, thus, lessening the chance of the passenger operating the inappropriate lever by mistake.

BRIEF DESCRIPTION OF THE DRAWINGS

Hereinafter, the present invention will be described in detail with reference to the drawings.

DETAILED DESCRIPTION OF THE INVENTION

Referring to the Figures, there can be seen a seatback frame (a) which constitutes a seatback (A). Seatback frame (a) consists of an upper frame (10) and a lower frame (20); both frames (10) and (20) are formed of bent pipes and the upper frame (10) is connected to the lower frame (20) free for inclination in the forward and backward direction relative to the lower frame (20).

Figure 1:
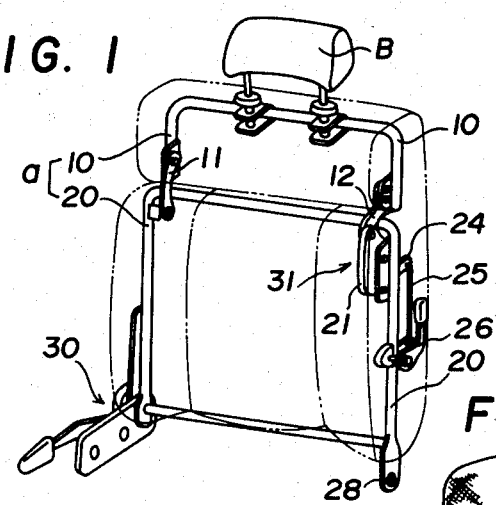
FIG. 1 is a perspective view of a seat for automobiles according to the present invention.

In the lower frame (20), a reclining device (30) is mounted along a seat frame (not illustrated) which supports a seat cushion (also not illustrated), while the one side of the lower frame (shown on the left hand side in FIG. 1) and the lower frame (20) are cooperatively mounted to be freely inclined in relation to the seat frame. The inclining device (30), which has been formerly employed in seats of this kind, is of well known construction. In the Figures there is also shown a free hinge part (28) of the lower end of the lower frame (20).

On the upper frame (10), a head rest (B) is supported in the center thereof, and the bottom of the upper frame (10) is rotatably connected to the lower frame (20) on the same side as the above-mentioned reclining device (30) by means of a hinge bracket (11). An intermediate reclining device (31) is mounted along the lower frame (20) and upper frame (10) on the side opposite the hinge bracket (11) so as to provide constant control of the rotation of the upper frame (10) by means of the device (31), whereby a position of the upper frame (10) achieved by turning same in relation to the lower frame (20) may be fixed.

The intermediate reclining device (31) is a mechanism which includes an arm (12) extending from the upper frame (10) and attached rotatably free to a shaft (22) mounted in a bracket (21), which, in turn, is fixed to the lower frame (20). The upper frame (10) is biased toward inclination in the forward direction relative to the lower frame (20) (i.e., toward the left in FIG. 3) by means of a spring 14, and the upper frame (10) is fixed through reclining device (31) to the lower frame (20) by means of a lock mechanism so that the degree of inclination can be fixed.

Figure 3:
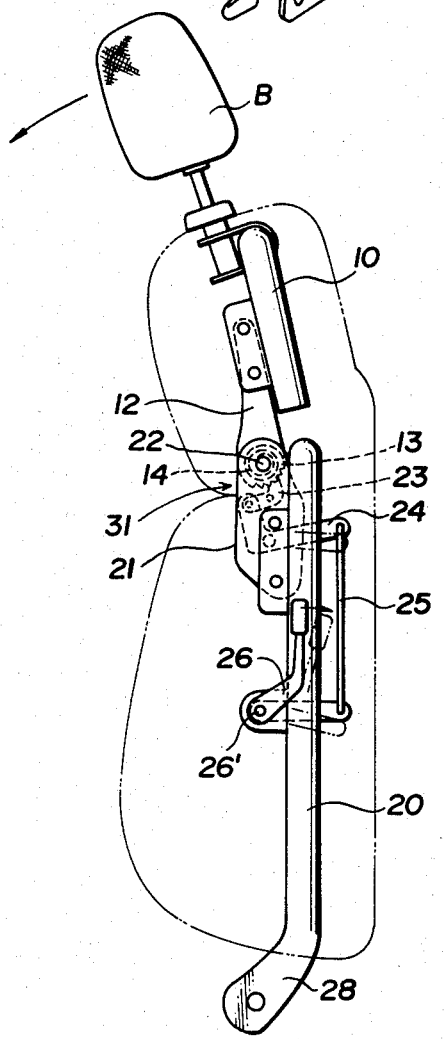
FIG. 3 is an enlarged cross sectional view showing an operating state thereof.
Figure 2:
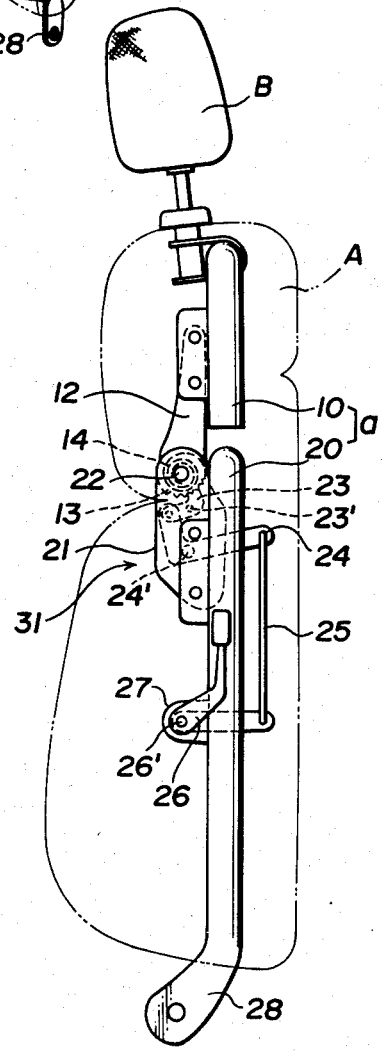
FIG. 2 is an enlarged cross sectional view thereof.

With regard to construction of the lock mechanism, locking is accomplished by engaging a stopper (23) mounted in the lower frame (20) with the gear (13) mounted on the arm (12). A lock release lever (26) is connected to the stopper (23) through a link (24) and a rod (25). The lock release lever (26) is pivotally fixed by means of a pin (26') to a bracket (27) mounted substantially midway between the upper and lower extremities of the lower frame (20). The stopper (23) and link (24) are pivotally fixed to the bracket (21) rotatably free by means of pins (23'), (24'), while the stopper (23) is biased in the engaging direction of the gear (13) by means of a spring (not illustrated). Therefore, as shown in FIG. 3, when the lock release lever (26) is pushed in the direction of the arrow against the elastic force of the spring, the rod (25) is pulled down as a result of the rotation of the lever (26). As a consequence, link (24) rotates clockwise, disengaging the stopper (23) from the gear (13) thereby to release the lock. The spring (14) is wound on shaft (22) and one end thereof is fixed to the arm (12) while the other end is fixed to the shaft (22), thus biasing the upper frame (10) in the forwardly inclined direction.

When the lock is released, the upper frame (10) can be pushed in the backward direction against the elasticity of the spring (14) in order to rotate the upper frame (10) in the backward direction, i.e., clockwise in FIG. 3. After the upper frame (10) has been turned to a desired position, the hand is removed from the lock release lever (26) so that the stopper engages with the gear (13) and locks same.

Since a seat for automobiles according to the present invention is constituted as described above, it provides the following advantages.

The balance of both reclining devices in the seatback frame is good since the intermediate reclining device is located on the opposite side of the lower reclining device. Therefore, the strength of the seatback frame increases as compared with the conventional product in which both reclining devices are located on one side of the seatback frame. Since the lock mechanism can be directly connected with the rod to the lock release lever of the intermediate reclining device, the cable adjustment process as was required in the conventional product employing the cable becomes unnecessary. Thus, the construction may be simplified resulting in a lower cost. Moreover, since the lock release lever of the lower frame's reclining device and the intermediate reclining device are located on the left and right sides of the seatback frames, there is no fear of erroneously operating one lever instead of the other.

What we claim is:

1. In a seat for vehicles wherein the seatback having two sides is divided into an upper part having an upper frame member and a lower part having a lower frame member, said upper frame member connected for inclination relative to said lower frame member, said lower frame member mounted for inclination on a seat frame, and seat further having a first reclining device fixed on one side thereof for adjusting the inclination of said lower seat frame forward and backward relative to said seat frame, the improvement comprising:

a hinge bracket connecting said upper frame member to said lower frame at said one side corresponding to said first reclining device for one-way inclination in the forward direction, an arm fixed to the lower part of said upper frame member at the other side opposite said hinge bracket and extending therefrom for pivotal connection to an intermediate reclining device, an intermediate reclining device mounted on the upper part of said lower frame member on said other side for controlled forward inclination of said upper frame member in relation to said lower frame member, said arm pivotally connected to said intermediate reclining device for forward pivoting with respect thereto, and a manual operating mechanism fixed to the lower end of said lower frame for actuating said intermediate reclining device to permit free rotation of said upper frame in relation to said lower frame, whereby the degree of inclination between said upper frame member and said lower frame member can be selectively established by a seat occupant.

2. The seat device according to claim 1 wherein said intermediate reclining device further comprises biasing means which urges said upper frame member forward in relation to said lower frame member.

3. The seat device according to claim 2 wherein said biasing means is a spring fixed to said arm and said intermediate reclining device which urges said arm rotatably forward around said pivotal connection of said arm to said intermediate reclining device whereby said upper frame member is urged forward.

4. The seat device according to claim 3 wherein said intermediate reclining device further comprises a holding means which holds the position of inclination of said upper frame member relative to said lower frame member achieved by inclining said upper frame member.

5. The seat device of claim 4 wherein said holding means comprises gear means fixed to said arm at said connection with said intermediate reclining device for engagement by a stopping device which is connected for disengaging actuation to said manual operating mechanism, said stopping device biased in the engaging direction to engage with said gear in the absence of disengaging actuation of said manual operating mechanism whereby inclination achieved by rotation of said upper frame member is held in place while said operation mechanism is not actuated.

6. The seat device of claim 5 wherein said manual operating mechanism is a lock release lever rotatably mounted on said lower seat member, which is connected to said stopping device by a link extending between said lever at the lower end of said lower frame member to said stopping device at the upper end of said lower frame member.

* * * * *